United States Patent
Murphy et al.

(10) Patent No.: US 12,270,569 B2
(45) Date of Patent: Apr. 8, 2025

(54) REVERSIBLE WATER-ABSORBING CONSTRUCTS COMPRISING PHASE-CHANGE POLYMER FILAMENTS

(71) Applicant: Palo Alto Research Center Incorporated, Palo Alto, CA (US)

(72) Inventors: Kathryn F. Murphy, Redwood City, CA (US); Ravi Neelakantan, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1064 days.

(21) Appl. No.: 17/198,362

(22) Filed: Mar. 11, 2021

(65) Prior Publication Data
US 2022/0290877 A1   Sep. 15, 2022

(51) Int. Cl.
F24F 3/14      (2006.01)
F24F 5/00      (2006.01)

(52) U.S. Cl.
CPC .......... *F24F 3/1429* (2013.01); *F24F 5/0014* (2013.01); *F24F 2003/1435* (2013.01)

(58) Field of Classification Search
CPC .......... B01D 5/00; B01D 53/26; B01D 53/28; F24F 3/14; F24F 5/00; C02F 1/285
See application file for complete search history.

(56) References Cited

U.S. PATENT DOCUMENTS

| | | |
|---|---|---|
| 2020/0031977 A1 | 1/2020 | Chintapalli et al. |
| 2020/0056355 A1 | 2/2020 | Yu et al. |
| 2021/0129075 A1* | 5/2021 | Sakikawa ............. F24F 3/1423 |

OTHER PUBLICATIONS

Du, H., et al., "Effects of Salt on the Lower Critical Solution Temperature of Poly(N-Isopropylacrylamide)," J. Phys. Chem B, 2010, pp. 16594-16604, 114.
Feoktistova, N., et al., "Porous thermo-responsive pNIPAM microgels," European Polymer Journal, 2015, pp. 650-656, 68.
Lutz, J.F., et al., "Point by Point Comparison of Two Thermosensitive Polymers Exhibiting a Similar LCST: Is the Age of Poly(NIPAM) Over?," J. Am. Chem. Soc., 2006, p. 13046-13047, 128.

(Continued)

*Primary Examiner* — Sharon Pregler
(74) *Attorney, Agent, or Firm* — Vorys, Sater, Seymour and Pease, LLP (57) ABSTRACT

Water removal from humidified air and other water-laden gases may be complicated due to the need for large and expensive capital equipment or use of powder-form desiccants that may lead to pressure drops, poor throughput and energy-intensive recovery of water. Reversible water-absorbing constructs may alleviate these difficulties and comprise: a phase change polymer exhibiting a reversible hydrophilic-hydrophobic phase transition, and at least one additional material in contact with the phase change polymer, such as a water-sorptive material. The phase change polymer and the at least one additional material are formed as a plurality of filaments. Filaments formed from the phase change polymer may be generated through an electrospinning process, which may be arranged in various higher level constructs, such as in fibers, fabrics and non-woven filament mats capable of absorbing water from humidified air or other water-laden gases.

16 Claims, 3 Drawing Sheets

(56) References Cited

OTHER PUBLICATIONS

De Oliveira, T.E., et al. "Effects of stereochemistry and copolymerization on the LCST of PNIPAm", J. Chem. Phys., 2017, 034904, 146.

Jain, K., et al., "Tunable LCST behavior of poly(N-isopropylacrylamide/ionic liquid) copolymers,", Polymer Chemistry, 2015, pp. 6819-6825, 6.

Seuring, J., et al, "Polymers with Upper Critical Solution Temperature in Aqueous Solution," Macromolecular Rapid Communications, 2012, pp. 1898-1920, 33.

Zhao, F., et al., "Super Moisture-Absorbent Gels for All-Weather Atmospheric Water Harvesting," Advanced Materials., 2019, pp. 1806446, 31.

Xue, J., et al., "Electrospinning and Electrospun Fibers: Methods, Materials, and Applications," Chemical Reviews, 2019, pp. 5298-5415, 119.

McCann, J.T., et al., "Highly Porous Fibers by Electrospinning into a Cryogenic Liquid," J. Am. Chem. Soc., 128, pp. 1436-1437, 128, Mar. 11, 2021.

Shekhar, S., et al., "Studies on thermal and swelling properties of Poly(NIPAM-co-2-HEA) based hydrogels," Advances in Materials Research, 2012, pp. 269-284, 1.

\* cited by examiner

REVERSIBLE WATER-ABSORBING CONSTRUCTS COMPRISING PHASE-CHANGE POLYMER FILAMENTS

FIELD

The present disclosure generally relates to absorption of water vapor and, more particularly, filament-based constructs for absorbing water vapor from air and other water-laden gases.

BACKGROUND

It can sometimes be desirable to remove at least a portion of the water vapor from air and other humidified gases. In some instances, removal of water may afford an at least partially dried gas stream that may be more suitable for certain applications, such as for conducting chemical syntheses requiring substantially anhydrous conditions. Drying of ambient atmosphere may also be desirable for dehumidification of buildings. In addition, water vapor from air can provide a ready supply of water in locales where conventional water purification techniques are problematic or there is not a suitable source of water than can be readily purified.

There are only a few suitable techniques for removing water from air and other gases: mechanical dewatering, exposure of the air or gas to liquid sorbents and utilizing membrane contactors, and passage of air or gas through solid desiccants disposed in a powder bed. Mechanical dewatering usually involves lowering the temperature of air or another gas below the dew point of water to promote condensation. Cooling may take place actively through a process utilizing external energy, such as refrigeration, or passively using materials that undergo radiative cooling to a temperature below the dew point. Mechanical dewatering may require a significant capital expenditure for refrigeration or similar equipment, and the equipment may not be readily applicable to remote locales or easily transportable thereto. Membrane contacting air or a similar gas with a liquid sorbent may be energy intensive and again not readily applicable to remote locales. Powder bed absorption utilizes solid desiccant particles that absorb water vapor upon their surface and in pores within their structure. Because of the packing density of many powder beds, large pressure drops may occur when passing air or another gas through the powder bed, which may result in a significant energy burden to achieve sufficient throughput. In addition, because water tends to absorb rather robustly upon many solid desiccants, recovery of the water may require heating well above ambient temperature in order to vaporize and then condense the water, thereby further adding to the energy burden.

A number of polymers are known to be water-absorbing due to their hydrophilicity, including so-called superabsorbent polymers, such as those found in diapers and other products where rapid, high-capacity absorption of liquid water is required. There are comparatively few examples of polymers that may achieve rapid and significant uptake of water vapor from air or other gases. U.S. Patent Application Publication 2020/0056355 discloses a gel-form polymer network, such as a hydrogel, formed from a hygroscopic polymer and a thermoresponsive (phase change) water storage polymer. However, the gel form of the polymer network is believed to limit air or gas throughput, thereby potentially leading to issues similar to those encountered with more conventional dewatering techniques and materials.

SUMMARY

In some embodiments, the present disclosure provides reversible water-absorbing constructs comprising: a phase change polymer exhibiting a reversible hydrophilic-hydrophobic phase transition, and at least one additional material in contact with the phase change polymer; wherein the phase change polymer and the at least one additional material are formed as a plurality of filaments.

In other embodiments, the present disclosure provides methods for forming water-absorbing constructs. The methods comprise: ejecting a homogeneous polymer blend through a spinneret; wherein the homogeneous polymer blend comprises a phase change polymer exhibiting a reversible hydrophilic-hydrophobic phase transition, and at least one additional material; and applying to the spinneret a potential sufficient to convert the homogeneous polymer blend into at least one filament comprising the phase change polymer and the at least one additional material in contact with the phase change polymer.

In still other embodiments, the present disclosure provides methods for dewatering a water-laden gas. The methods comprise: providing a sorptive fabric or a non-woven filament mat comprising a plurality of filaments comprising a phase change polymer exhibiting a reversible hydrophilic-hydrophobic phase transition and at least one additional material in contact with the phase change polymer, the at least one additional material comprising at least a water-sorptive material; flowing a water-laden gas through the sorptive fabric or the non-woven filament mat at first conditions under which the phase change polymer is hydrophilic; and absorbing at least some water from the water-laden gas onto the sorptive fabric or the non-woven filament mat under the first conditions and forming an at least partially dehydrated gas.

In yet still other embodiments, the present disclosure provides systems for dewatering a water-laden gas. The systems comprise: a sorptive fabric or a non-woven filament mat comprising a plurality of filaments comprising at least a phase change polymer exhibiting a reversible hydrophilic-hydrophobic phase transition and at least one additional material in contact with the phase change polymer, the at least one additional material comprising at least a water-sorptive material; a gas inlet and a gas outlet configured to provide a gas flow path through the sorptive fabric or the non-woven filament mat; and a heater effective to heat the sorptive fabric or the non-woven filament mat above a critical phase transition temperature at which the phase change polymer undergoes a phase transition from a hydrophilic state to a hydrophobic state.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

The present disclosure generally relates to absorption of water vapor and, more particularly, filament-based constructs for absorbing water vapor from air and other water-laden gases.

As discussed above, absorption of water vapor from air and other water-laden gases may be desirable, yet doing so is problematic in various respects. Considerable capital equipment investments and/or significant energy expenditures may be required, particularly when dewatering is to be performed on a large scale. Some dewatering strategies may further result in large pressure drops across a sorbent material and also lead to difficult recovery of water when regenerating the sorbent material. When recovery of water is the desired outcome of a dewatering operation, rather than obtaining at least partially dried air or gas, the foregoing difficulties may render conventional dewatering techniques unsuitable in many instances, particularly in remote locales.

Although the combination of hygroscopic and thermoresponsive (phase change) polymers in a gel-form polymer network has shown some success in removing water vapor from a gas, as described in U.S. Patent Application Publication 2020/0056355, the gel form of these polymers may not be readily amenable for avoiding large pressure drops and for facilitating high gas throughput. The present disclosure, in contrast, describes reversible water-absorbing constructs that comprise a plurality of filaments formed from at least a phase change polymer. The reversible water-absorbing constructs may comprise one or more fibers formed from the plurality of filaments, and higher-order constructs may be defined by arranging the fibers together in a fabric, including both woven and non-woven fabrics, which may be further layered with one another if desired. Non-woven filament mats may also be utilized in the embodiments disclosed herein. In addition, the reversible water-absorbing constructs may comprise a plurality of pores, both within the individual filaments themselves and in the interstices or channels between the fibers in a fabric, such that two or more pore sizes may be present. The porosity may facilitate water absorption by providing a large surface area for contact to take place with water-laden air or another water-laden gas. The interstitial porosity and channels, in addition, may provide a ready flow pathway through the constructs, thereby avoiding the pressure drops characteristic of other types of sorbent materials. The size and structure of the pores and channels in a fabric are furthermore easily varied, enabling tunability of the pressure drop and optimization of the system efficiency, particularly the amount of energy needed to absorb water vapor from a given amount of air.

A phase change polymer suitable for use in the present disclosure may undergo a reversible transition from a hydrophilic state to a hydrophobic state (i.e., a reversible hydrophilic-hydrophobic phase transition) above a critical phase transition temperature, thereby facilitating release of water once the hydrophobic state has been attained. Particularly desirable phase change polymers may attain the hydrophobic state at a temperature not too far above room temperature, thereby allowing release of liquid water to be realized. This approach for releasing water may be significantly less energy intensive than are conventional processes in which water vapor is expelled from a sorbent material at considerably higher temperatures and subsequently condensed to reform liquid water. Once release of liquid water has taken place and cooling below the critical phase transition temperature has occurred, the phase change polymer may then absorb additional water vapor from a water-laden air or gas. Alternately, the transition from the hydrophilic state to the hydrophobic state may take place by exposing the constructs to specified salinity or pH conditions, exposing the constructs to electromagnetic radiation (e.g. sunlight or another light source that promotes the phase transition), or applying a mechanical force that promotes the phase transition to the constructs. Any of these alternative processes may facilitate release of water as well, optionally in combination with increasing the temperature above the critical phase transition temperature. Upon cooling below the critical phase transition temperature and/or removing conditions that otherwise attain the hydrophobic state, the hydrophilic state may spontaneously reform in preparation for absorbing additional water from a water-laden gas.

Surprisingly, when suitable phase change polymers are paired with other types of water-sorptive materials (e.g., metal or non-metal oxides, zeolites, charged hydrophilic polymers, metal-organic frameworks, or the like) in the constructs disclosed herein, synergistic water absorption properties may be realized in some instances. That is, the reversible water-absorbing constructs of the present disclosure may absorb a greater amount of water than a combined amount of water obtained from separated, equivalent amounts of the phase change polymer and the additional water-sorptive materials. Without being bound by theory or mechanism, this surprising result is believed to arise from the fact that phase change polymers (e.g., poly(N-isopropylacrylamide) and similar polymers and copolymers, discussed below) are poor absorbers of water vapor, whereas they readily absorb liquid water. Water-sorptive materials are believed to absorb a substantial liquid water layer on their surface, thereby providing a ready source of water to promote swelling of the phase change polymer without undergoing swelling themselves due to their rigidity. Thus, when paired in a water-absorbing construct, the water-sorptive material may promote apparent absorption of water vapor by the phase change polymer. Even small amounts of a water-sorptive material may promote this process (e.g., in a catalytic-type manner).

Electrospinning processes may be particularly beneficial for converting a phase change polymer into filaments suitable for use in the disclosure herein. Advantageously, electrospinning processes may afford extremely small filament diameters, thereby increasing the available surface area for air or gas contact to take place once processed into a construct. Depending on the chosen electrospinning conditions, the filament diameter and porosity may be regulated to promote tailoring of the surface area or modification of other construct properties. Moreover, phase change polymers and various water-sorptive materials may be combined in homogeneous blends that may undergo ready electrospinning as well, thereby forming composite filaments with the phase change polymer and the water-sorptive material in intimate contact. Such composite filaments may be particularly suitable for forming the reversible water-absorbing constructs of the present disclosure, given the advantageous properties afforded by having the phase change polymer and the water-sorptive material in contact with one another, as discussed above. Electrospinning processes will be familiar to one having skill in the art and are described in further detail hereinbelow.

Terms used in the description and claims herein have their plain and ordinary meaning, except as modified by the paragraphs below.

As used herein, the term "room temperature" is about 25° C.

As used herein, the term "phase change polymer" refers to a polymer having at least two different morphological forms, in which the morphological forms interconvert under specified conditions. The change between morphological forms may be physical in nature or involve reversible chemical bond formation.

As used herein, the term "oxide" refers to both metal oxides and non-metal oxides. For purposes of the present disclosure, silicon is considered to be a metal.

As used herein, the term "admixed," refers to homogeneous blending of a first substance with a second substance, including dissolution of the second substance in the first substance.

As used herein, the term "water-laden" refers to air or a gas containing at least some water vapor. Water-laden air or gas is not necessarily saturated with water.

Reversible water-absorbing constructs of the present disclosure may comprise a phase change polymer exhibiting a reversible hydrophilic-hydrophobic phase transition, and at least one additional material in contact with the phase change polymer. The phase change polymer and the at least one additional material may be formed as a plurality of filaments. The plurality of filaments may be formed as at least one fiber or a similar higher-level arrangement of filaments, as discussed further below. As also described further below, the filaments may be composite filaments comprising the phase change polymer and the at least one additional material, particularly wherein the at least one additional material is admixed with the phase change polymer. Suitable additional materials that may be present in combination with the phase change polymer are described in further detail below. Preferably, the at least one additional material may comprise at least a water-sorptive material in contact with the phase change polymer.

The reversible water-absorbing constructs disclosed herein represent a hierarchical structure in which a filament is the basic structural unit of the constructs. Simple constructs formed from filaments may comprise one or more fibers, each of which comprises a plurality of the filaments, or non-woven filament mats containing a random arrangement of filaments. Higher-level constructs may comprise a plurality of the fibers arranged in various ways to define a sorptive fabric.

The reversible water-absorbing constructs disclosed herein may have a high surface area, and the magnitude of the surface area may be determined by the diameter and arrangement of the filaments and fibers. Fibers, for example, when arranged in a fabric, may have interstitial pores or channels between individual fibers. In addition, the filaments may have pores defined within a body of the filaments, and fibers may further have interstitial space or channels within the fibers themselves. As such, there may be two or more types and/or sizes of pores or interstices within the reversible water-absorbing constructs disclosed herein, all of which may increase the available surface area in the constructs. The large surface area may be utilized for contacting water-laden air or gas to facilitate dewatering.

Advantageously, the phase change polymer and the at least one additional material may be admixed within a given filament and/or fiber formed therefrom. Specifically, the phase change polymer and the at least one additional material may be combined and blended together homogeneously prior to the formation of filaments. Once filament formation has taken place (e.g., by electrospinning a combined solution of the phase change polymer and the at least one additional material), the phase change polymer and the at least one additional material may form composite filaments in which the phase change polymer and the at least one additional material are admixed together with one another in intimate contact. As noted above, by having the phase change polymer and a water-sorptive material in intimate contact, particular advantages may be realized when promoting water absorption according to the disclosure herein. Alternately, constructs of the present disclosure may contain filaments or fibers in which the at least one additional material is located upon a surface of the phase change polymer within the at least one fiber and/or individual filaments, or the at least one additional material is buried within the at least one fiber and/or individual filaments (e.g., the at least one additional material may be present in a filament core, and the phase change polymer may comprise an outer shell of individual filaments). Localization of the at least one additional material upon the surface of the phase change polymer may alternately be realized by forming separate filaments of the at least one additional material and processing into fibers, and/or by surface coating the at least one additional material upon a surface of phase change polymer filaments or fibers. When the phase change polymer and the at least one additional material are in separate filaments or fibers, filaments comprising the phase change polymer may further comprise a support material as needed to promote filament formation. The at least one additional material may comprise at least a portion of the support material. More desirably, the phase change polymer and the at least one additional material may be admixed with one another in a common filament to promote a high area of contact between the two components.

Reversible water-absorptive constructs of the present disclosure may comprise at least one fiber comprising a plurality of filaments, more typically a plurality of fibers each comprising a plurality of filaments, or a non-woven filament mat comprising a plurality of filaments that are not further arranged with one another (i.e., randomly arranged). Although reversible water absorption may be realized with multiple fibers or filaments that are not further arranged or arrayed with one another, handling of the fibers or filaments, particularly at larger scales, may be facilitated by arranging a plurality of the fibers together to define a sorptive fabric. In addition, various levels of porosity or interstices may be created by arranging a plurality of fibers together to define a sorptive fabric. The term "fabric" is to be construed broadly herein and includes both regular and irregular arrangements of individual filaments and fibers, which may or may not be further bonded together. Suitable fabrics of the present disclosure may be woven or non-woven in nature. Woven fabrics may be formed by arranging individual fibers together in a substantially regular pattern without adhering the fibers together. Non-woven fabrics, in contrast, may be formed by arranging individual fibers together and bonding the fibers together through chemical, mechanical, heat, or solvent treatment. Heat treatment, for example, may be conducted by raising the phase change polymer above its softening temperature or glass transition temperature and then cooling once individual fibers have partially coalesced with one another.

In addition, suitable fabrics may comprise substantially a single layer of fibers or contain multiple layers of fibers, optionally with the fibers being arrayed in all three dimensions. Multi-layer fabrics may also be formed by adhering multiple fabric layers to one another and/or to a support fabric layer or similar support layer, as described further below. Suitable fabrics may be substantially flat or pleated.

Figure 1:
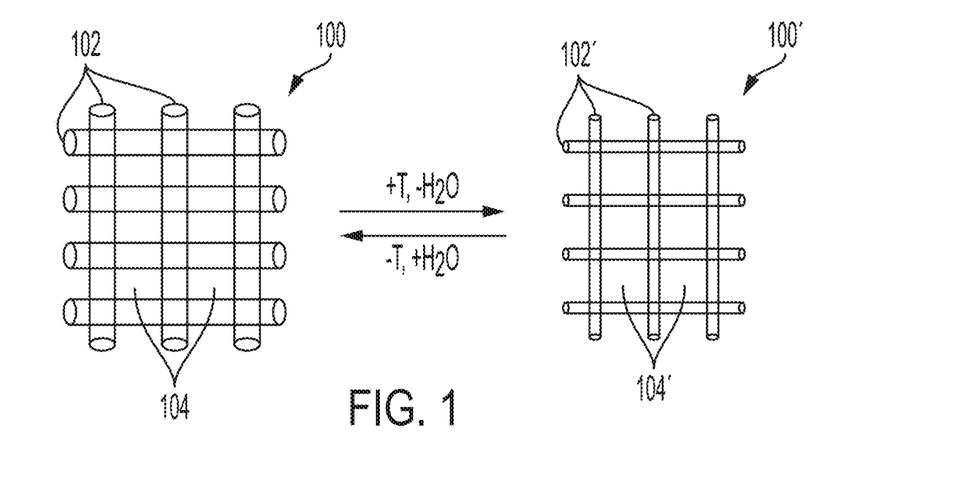
FIG. 1 is a diagram showing a sorptive fabric comprising a plurality of fibers comprising a phase change polymer and how the morphology of the sorptive fabric may change upon absorbing and releasing water.

FIG. 1 is a diagram showing a sorptive fabric comprising a plurality of fibers comprising a phase change polymer and how the morphology of the sorptive fabric may change upon absorbing and releasing water. When a sorptive fabric is below the critical phase transition temperature, the phase change polymer may exist in a hydrophilic state so that absorption of water may take place. As shown in FIG. 1, hydrated fabric 100 may exist in a swollen state due to the presence of hydrophilic fibers 102, which comprise at least filaments formed from a phase change polymer and are arranged to define interstices (pores) 104 or channels in between. Hydrophilic fibers 102 are in a swollen state in FIG. 1 due to the presence of absorbed water (e.g., sequestered from water-laden air or gas). Additional water may be held within interstices 104. Interstices and channels may also be present within individual hydrophilic fibers 102 as well. Further, micropores and/or nanopores (not shown) may also be present within individual filaments comprising hydrophilic fibers 102 as well.

Upon being heated above the critical phase transition temperature, the phase change polymer may undergo a change in morphology to afford a hydrophobic state, thereby resulting in release of water from hydrophilic fibers 102 as they transition to the hydrophobic state and form dehydrated fabric 100'. Alternately, the phase change polymer may undergo the change in morphology in response to altering the pH or by adding a salt to a fluid in contact with the fabric or similar construct, exposing the fabric to a mechanical force, or irradiating the fabric with electromagnetic radiation capable of promoting the phase change. Additional tailoring of the phase change behavior may be realized by co-polymerizing one or more co-monomers with a predominant monomer that induces reversible phase change behavior. Provided that the critical phase transition temperature is below the boiling point of water, the water may be released in a liquid state.

Referring still to FIG. 1, above the critical phase transition temperature, dehydrated fabric 100' exists in a substantially non-swollen state containing hydrophobic fibers 102', which may possess at least one dimension (e.g., length and/or diameter) smaller than that of hydrophilic fibers 102 as a consequence of release of water therefrom. Interstices 104' are also larger in dehydrated fabric 100' due to the decreased swelling. Lowering the temperature below the critical phase transition temperature and exposure to additional water-laden air or gas may reform hydrated fabric 100. Alternately, dehydrated fabric 100' may be returned to a condition suitable for absorbing additional water vapor by removing any alternative conditions that lead to formation of the hydrophobic state. After being returned to a hydrophilic state but before exposure to additional water-laden air or gas, the fabric may resemble dehydrated fabric 100'.

Figure 2:
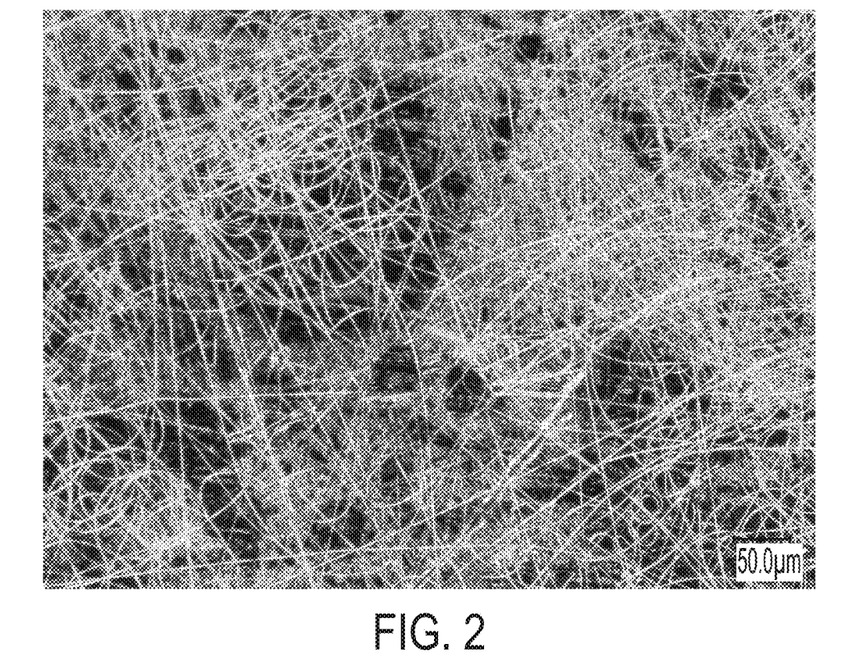
FIG. 2 shows an optical microscope image of a plurality of filaments comprising a phase change polymer that are arranged irregularly in a mat.

Although FIG. 1 has shown a fabric comprising a substantially regular array of fibers formed from a phase change polymer, it is to be appreciated that irregular arrays of fibers or filaments may similarly define a fabric suitable for use in the present disclosure. For example, suitable fabrics may comprise a mat of entangled filaments, particularly a non-woven filament mat. FIG. 2 shows an optical microscope image of a plurality of filaments comprising a phase change polymer that are arranged irregularly in a mat.

Figure 3:
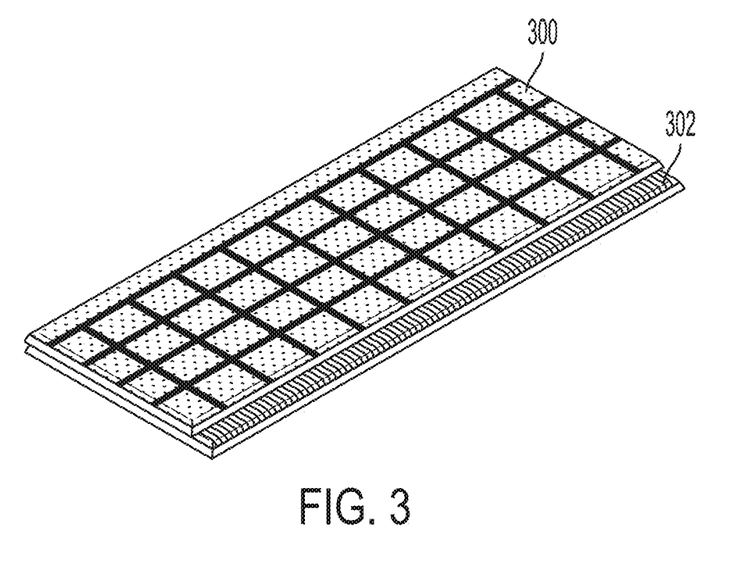
FIG. 3 shows a diagram of a sorptive fabric disposed upon a support layer.

In addition, the reversible water-absorptive constructs of the present disclosure may further comprise a support layer upon which the plurality of filaments described above (e.g., a fabric, filament or similar arrangement of filaments) is overlaid or adhered thereto. Suitable support layers may comprise a metal, ceramic, or glass mesh, a support fabric, or a similar porous support that does not include a phase change polymer. Inclusion of a support layer may improve the mechanical strength of the reversible water-absorbing constructs and facilitate their manipulation. Because the support layer also may have a high degree of porosity, inclusion of a support layer does not significantly impede the flow of water-laden air or gas through the constructs described herein. FIG. 3 shows a diagram of sorptive fabric 300, as defined herein, disposed upon support layer 302. Other types of porous supports upon which filaments, fibers or fabrics may be present are also suitable for use in the disclosure herein. In addition, multiples layers of sorptive fabric 300 may be disposed upon support layer 302 as well.

Phase change polymers suitable for use in the present disclosure may undergo a hydrophilic-hydrophobic transition at or above a critical phase transition temperature. The transition may occur reversibly. Above the critical phase transition temperature and as the phase change occurs, the phase change polymer may transition to a hydrophobic state and release liquid water. Phase change polymers suitable for use in the present disclosure may exhibit a critical phase transition temperature of about 10° C. to about 80° C., or about 20° C. to about 70° C., or about 25° C. to about 70° C., or about 30° C. to about 70° C., or about 30° C. to about 65° C., or about 30° C. to about 60° C., or about 30° C. to about 45° C.

Alternately, suitable phase change polymers may undergo a change from a hydrophilic state to a hydrophobic state upon exposure to specified salinity or pH conditions, exposure to electromagnetic radiation, or upon being subjected to a mechanical force. The critical phase transition temperature may further be altered at different pH values or in the presence of added salt. Thus, any combination of thermal conditions, pH and/or salinity conditions, irradiation conditions, or mechanical force may be utilized to promote a hydrophilic to hydrophobic transition in the disclosure herein to facilitate release of liquid water from the constructs.

Suitable phase change polymers that undergo a thermal phase change may include homopolymers or copolymers comprising an N-alkyl(meth)acrylamide monomer unit or an N,N-dialkyl(meth)acrylamide monomer unit. Such copolymers may be random or block. The term "(meth)acrylamide" indicates that the monomer unit may be derived from an acrylamide or methacrylamide parent monomer. Preferably, phase change polymers suitable for use in the disclosure herein may comprise an N-alkylacrylamide monomer unit or an N,N-dialkylacrylamide monomer unit, such as a $C_1$-$C_4$ N-alkylacrylamide or a $C_1$-$C_4$ N,N-dialkylacrylamide (e.g., N-methylacrylamide, N-ethylacrylamide, N-propylacrylamide, N-isopropylacrylamide, N-butylacrylamide, N-isobutylacrylamide, N-sec-butylacrylamide, N-tert-butylacrylamide, N,N-dimethylacrylamide, N,N-diethylacrylamide, N,N-dipropylacrylamide, N,N-diisopropylacrylamide, N-methyl-N-ethylacrylamide, N-methyl-N-propylacrylamide, N-ethyl-N-propylacrylamide, N-methyl-N-isopropylacrylamide, N-ethyl-N-isopropylacrylamide, or the like). Other monomer units that may be present in suitable phase change polymers include, for example, acrylamide monomers, acrylic acid monomers, acrylate ester monomers, vinyl ether monomers, and vinylcaprolactam monomers. Any of these monomer units may be present in a copolymer in combination with a N-alkylacrylamide monomer unit or an N,N-dialkylacrylamide monomer unit, such as N-isopropylacrylamide or N,N-diethylacrylamide. In addition, some suitable phase change polymers may include block copolymers of polyethylene oxide or polypropylene oxide with a block containing an N-alkylacrylamide or N,N-dialkylacrylamide monomer unit. Copolymers comprising a monomer unit capable of promoting a suitable phase change may be present in combination with any monomer unit that does not promote phase change behavior, provided that a sufficient amount of monomer units capable of promoting a phase change remain to maintain the phase change feature in the copolymer as a whole. Thus, the amount of co-monomer not promoting phase change behavior may be utilized to tailor the extent of the phase change and/or the temperature at which the phase change occurs in a copolymer. When present, co-monomers not capable of promoting a phase change may be included in a non-zero amount less than 30 wt. % or less of the copolymer, or about 20 wt. % or less of the copolymer, or about 10 wt. % or less of the copolymer, or about 5 wt. % or less of the copolymer.

In some embodiments, a particularly suitable phase change polymer for use in the disclosure herein may comprise poly-(N-isopropylacrylamide) or a copolymer thereof. Poly-(N-isopropylacrylamide) may undergo a reversible hydrophilic-hydrophobic phase transition over a temperature range of about 30° C. to about 40° C., which is particularly convenient for avoiding excessive energy input during water recovery and regeneration of a construct to collect additional water.

Other suitable phase change polymers that may be suitable for use in the disclosure herein include polysaccharide derivatives or polysaccharides co-polymerized with another monomer unit, such as an N-alkylacrylamide or an N,N-dialkylacrylamide monomer unit. Example polysaccharide derivatives that may exhibit a phase change include, for example, hydroxyethylcellulose, hydroxypropylcellulose, 2-hydroxy-3-isopropoxypropyl hydroxyethylcellulose, 2-hydroxy-3-butoxypropyl hydroxyethylcellulose, and the like. Still other phase change polymers that may be suitable for use in the disclosure herein include, for example, poly (ethylene oxide), poly(propylene oxide), poly(ethylene glycol), or any combination thereof.

Phase change polymers undergoing a reversible hydrophobic-hydrophilic phase transition in response to electromagnetic radiation exposure may include those having a polymer backbone with a photosensitive group appended to the polymer backbone, in which the photosensitive group interconverts between different chemical forms or undergoes a change in dipole moment in the presence or absence of suitable electromagnetic radiation. Particular photosensitive groups that may be suitable include, for example, azobenzenes and spiropyrans. Polymer backbones need only to have compatible functionality for attaching the photosensitive groups and are not believed to be particularly limited.

In particular embodiments, the phase change polymers used in the disclosure herein may be non-crosslinked and/or not part of an interpenetrating network with another polymer. Interpenetrating networks may be formed, for example, by polymerizing one or more monomer units in the presence of another previously formed polymer. When a phase change polymer is combined with another polymer in the disclosure herein, both the phase change polymer and the other polymer are already in a polymerized state, thereby not leading to formation of an interpenetrating network during polymer blending.

Various additional materials may be present in combination with the phase change polymer in the reversible water-absorbing constructs disclosed herein. Suitable additional materials may comprise at least one water-sorptive material, at least one structural reinforcement material, at least one pore-forming material, at least one functional material, or any combination thereof. Preferably, at least one water-sorptive material is present in combination with the phase change polymer in the constructs disclosed herein. Some or other constructs may comprise a structural reinforcement material, an artificial pore-former, a functional material, or any combination thereof, including any of the foregoing in further combination with at least one water-sorptive material. Suitable functional materials may include, for example, electrical conductors, light-absorbing materials, pigments, piezoelectric materials, pyroelectric materials, thermoelectric materials, or any combination thereof. Example functional materials of these types will be familiar to persons having ordinary skill in the art.

Particularly suitable examples of the reversible water-absorptive constructs disclosed herein may comprise at least one water-sorptive material. Suitable examples of water-sorptive materials that may be present in the constructs include, for example, a metal or non-metal oxide, a zeolite, a charged hydrophilic polymer, a metal organic framework, or any combination thereof. Examples of charged and/or hydrophilic polymers that may be present in combination with a phase change polymer in the constructs disclosed herein include, for example, polyacrylic acids; functionalized poly(meth)acrylates and poly(meth)acrylamides, such as poly(aminoalkyl(meth)acrylates) and poly(aminoalkyl (meth)acrylamides); polypyrroles, polyanilines, polyvinylpyridines, polyvinylimidazoles, polycarbazoles, polyindoles, polyazepines and copolymers thereof. Suitable metal or non-metal oxides that may be present in combination with a phase change polymer include, for example, silica and aluminum oxide. Other types of desiccants may be employed similarly. Any of the foregoing water-sorptive materials may be present in filaments formed from a phase change polymer in accordance with the disclosure herein.

Desirably, a phase change polymer and a water-sorptive material may interact synergistically in the reversible water-absorbing constructs disclosed herein, such that a greater quantity of water is absorbed by the construct are separated, substantially equivalent weights of the phase change polymer and the at least one water-sorptive material. For example, if a 100-gram construct containing 50 grams of phase change polymer and 50 grams of water-sorptive material absorbs 200 grams of water when there is a synergistic interaction, 50 grams of phase change polymer and 50 grams of water-sorptive material separated from one another would absorb less than 200 grams of water in total. A putative and non-limiting mechanism for the absorption of water vapor is proposed above. A synergistic interaction is believed to be present with respect to absorption of water vapor, since phase change polymers tend to absorb water vapor poorly (<1% on a mass basis), and water-sorptive materials such as silica tend to absorb relatively low amounts of water on a mass basis. When these two materials are present together, a much higher amount of water is absorbed, even though neither material is a particularly good absorber of water vapor by itself.

Water-sorptive materials may be present in the constructs described herein in an amount up to about 70 wt. % relative to the constructs as a whole. The amount of the water-sorptive material may be selected such that water vapor may be collected effectively by the phase change polymer (as opposed to the water-sorptive material primarily accounting for water absorption by the constructs) and released thereafter. In more specific embodiments, the constructs may comprise about 5 wt. % to about 70 wt. % based on the constructs as a whole, or about 5 wt. % to about 20 wt. %, or about 20 wt. % to about 40 wt. %, or about 40 wt. % to about 60 wt. %, or about 5 wt. % to about 15 wt. %, or about 10 wt. % to about 20 wt. %.

At least some structural reinforcement materials and functional materials may convey water absorption capabilities on their own in addition to promoting structural reinforcement and/or conveying additional functional properties to the filaments and constructs formed therefrom. Suitable examples of structural reinforcement materials may include polymers that may promote filament formation through electrospinning and/or polymers that do not exhibit phase change behavior by themselves but filaments comprising such polymers do so. Suitable polymers used for promoting structural reinforcement may be sufficiently hydrophobic such that water released from the phase change polymer upon transitioning from a hydrophobic state to a hydrophilic state is not substantially retained by the constructs.

Suitable functional materials may convey additional properties to the filaments and constructs that are not afforded by the phase change polymer or other material. Non-limiting examples of functional materials may be thermal absorbers, electromagnetic radiation absorbers, conductive additives, or any combination thereof. Suitable functional materials may include, but are not limited to, carbon black, carbon nanotubes, graphene, metal nanowires, metal particles and nanoparticles, or any combination thereof. Thermal absorbers or electromagnetic radiation absorbers such as carbon black, carbon nanotubes and graphene, may be used promote raising the temperature of the constructs above the critical phase transition temperature in a more energy efficient manner.

In some embodiments, the at least one additional material may comprise a structural reinforcement material. Suitable structural reinforcement materials may be polymeric, such as poly(meth)acrylic acid or PVP (polyvinylpyrrolidone). Additional structural reinforcement materials that may be present in combination with the phase change polymer include, for example, metal nanowires, carbon nanotubes, graphene or any combination thereof. Metal nanowires, carbon nanotubes, and graphene may also convey functional properties in some instances, such as electrical conductivity where they are present.

Artificial pore formers, such as water-soluble metal salts and dissolvable or degradable polymers or waxes, may also be present in the constructs disclosed herein. Dissolution, degradation or melting of these materials may introduce a plurality of pores in the constructs or filaments where the substances were present prior to their dissolution, degradation or melting. Wax particulates, for example, may constitute a suitable artificial pore former in the disclosure herein, wherein the wax particulates may melt below the critical phase transition temperature and induce formation of a plurality of pores. Pore sizes may also be altered without using an artificial pore former, such as through altering the solvent used when promoting polymerization to form the phase change polymer or the solvent used for processing a polymer blend during electrospinning.

Particularly suitable examples of the reversible water-absorption constructs disclosed herein may be formed by incorporating filaments prepared through an electrospinning process. Electrospinning processes, described in greater detail hereinafter, are not believed to be particularly limited and may be effectively conducted by one having ordinary skill in the art. Electrospinning processes may be particularly desirable when forming filaments comprising a phase change polymer, since very small filament diameters may be produced, thereby conveying at least some of the advantages described above. In addition, some phase change polymers may not be effectively spun by alternative processes such as melt spinning. Further, various additional materials may be effectively blended with the phase change polymer during electrospinning, thereby producing composite filaments in which the additional materials are admixed with the phase change polymer and/or are alternately disposed upon the surface of the phase change polymer.

Accordingly, methods for producing reversible water-absorption constructs according to the disclosure herein may comprise: providing or forming a homogeneous polymer blend comprising a phase change polymer exhibiting a reversible hydrophilic-hydrophobic phase transition, and at least one additional material; ejecting the homogeneous polymer blend through a spinneret; and applying to the spinneret a potential sufficient to convert the homogeneous polymer blend into at least one filament comprising the phase change polymer and the at least one additional material in contact with the phase change polymer.

The electrospinning process may take place under conventional conditions for producing electrospun filaments. Electrospinning may be conducted using a solution of the phase change polymer in any solvent in which the phase change polymer is soluble and which evaporates in the gap between the spinneret and collector plate of the electrospinning system. Concentrations upon the solubility limit of the phase change polymer may be employed. Gauge sizes for the spinneret may range from about 16 gauge to about 30 gauge, which may afford filament diameters in a range of about 100 nm to about 10 µm, although even smaller gauge sizes may be used. Electric field strengths ranging from about 0.01 kV/mm to about 1 kV/mm may be suitably used, particularly electric field strengths within a range of about 0.06 kV/mm to about 0.2 kV/mm. In addition to the spinneret size, the diameter of the filaments may be further varied depending upon the field and the flow rate. The separation between the spinneret and the collector plate are not particularly limited but may range from about 5 cm to about 100 cm, particularly in a range of about 10 cm to about 20 cm or about 10 cm to about 15 cm. Flow rates may range from about 0.1 mL/hr to about 10 mL/hr, or about 0.1 mL/hr to about 5 mL/hr.

Filaments comprising a phase change polymer that are produced by electrospinning may have diameters ranging from about 10 nm to about 100 µm, or about 100 nm to about 10 µm, or about 100 nm to about 1 µm. Smaller filament diameters may be favorable, since they provide a larger surface contact area with water vapor. The filaments may then be processed into fibers having a fiber diameter ranging from about 100 µm to about 5 mm, or about 500 µm to about 5 mm, or about 100 µm to about 1 mm, or about 500 µm to about 1 mm, or about 1 mm to about 5 mm. Filaments having diameters within any of the foregoing ranges may be utilized in any of the constructs disclosed herein.

Once filaments have been produced using an electrospinning process, the at least one filament may be processed into at least one fiber or a sorptive fabric. Fibers may be twisting a plurality of filaments together, and fibers may be further processed into sorptive fabrics, which may be woven or non-woven in nature. Suitable techniques for forming fibers and converting fibers into fabrics will be familiar to one having ordinary skill in the art. Non-woven filament mats may also be suitable for use in the disclosure herein. Any fiber or fabric formed from filaments comprising a phase change polymer may be utilized in any of the constructs disclosed herein.

Pore sizes within individual filaments may range from about 1 nm to about 100 nm, or from about 5 nm to about 250 nm, or from 100 nm to about 250 nm. Pores within the 100 nm to 250 nm range may be particularly robust for promoting reversible uptake and release of water. In some embodiments, at least two different pore sizes may be present in the filaments formed according to the disclosure herein. Once processed into fibers, the fibers may have even larger pores and channels than those present in the individual filaments themselves. Any pore size within the foregoing range may be utilized in any of the constructs disclosed herein.

Systems and methods for at least partially dewatering water-laden air or gas are also contemplated by the present disclosure. Such systems and methods may flow the water-laden air or gas through the constructs while the phase change polymer is in the at least partially dehydrated and in the hydrophilic state. Once the construct becomes saturated with water withdrawn from the water-laden air or gas, the systems and methods may transition the phase change polymer into the hydrophobic state (e.g., through heating above the critical phase transition temperature or exposure to other conditions that cause a phase transition) to promote recovery of the water and regeneration of the construct for treatment of additional water-laden air or gas. As non-limiting examples, such methods may be utilized for dehumidification of a building's ambient atmosphere, promote formation of an at least partially dehydrated (dried) gas, and/or recover potable water for use in various applications. Water recovery, for example, may be conducted on an individual scale or at a commercially relevant scale.

Accordingly, dewatering methods of the present disclosure may comprise: providing a reversible water-absorbing construct of the present disclosure; flowing a water-laden gas through the construct at first conditions under which the construct is hydrophilic; absorbing at least some water from the water-laden gas onto the construct under the first conditions and forming an at least partially dehydrated gas; and optionally exposing the construct to second conditions under which the phase change polymer is hydrophobic and liquid water is recovered from the construct. Individual filaments, a plurality of filaments (e.g., a non-woven filament mat), individual fibers, a plurality of individual fibers, or a plurality of filaments or fibers arrayed as a fabric may be utilized to accomplish the foregoing. The first conditions may include any combination of temperature, pH, salinity, irradiation, or mechanical force to aid in maintaining the hydrophilic state. Any of the foregoing or combination of the foregoing may be changed to transition the phase change polymer from a hydrophilic state to a hydrophobic state to promote dewatering.

As described above, suitable constructs for promoting dewatering may comprise a fabric formed from a plurality of fibers or a plurality of filaments (e.g., a non-woven filament mat) that comprise a suitable phase change polymer. Suitable fabrics may be single-layer or multi-layer. Multi-layer fabrics may contain fibers arrayed in three dimensions, or multiple fabric layers may be adhered to one another and/or to a support fabric layer to define a multi-layer fabric. In addition, suitable fabrics may be woven or non-woven and/or pleated or non-pleated.

More specifically, such dewatering methods utilizing a sorptive fabric or a non-woven filament mat may comprise: providing a sorptive fabric or a non-woven filament mat comprising a plurality of filaments comprising at least a phase change polymer exhibiting a reversible hydrophilic-hydrophobic phase transition and at least one additional material in contact with the phase change polymer, the at least one additional material comprising at least a water-sorptive material; flowing a water-laden gas through the sorptive fabric or the non-woven filament mat at first conditions under which the phase change polymer is hydrophilic; and absorbing at least some water from the water-laden gas onto the sorptive fabric or the non-woven filament mat under the first conditions and forming an at least partially dehydrated gas. The water-laden gas may be water-laden air (i.e., humidified air) or another type of water-laden gas that is substantially unreactive with the sorptive fabric (e.g., an inert gas such as nitrogen or argon, carbon dioxide, or natural gas).

Flow rates of the water-laden air or gas may be selected such that at least some water absorption occurs upon the construct. Gas flow rates may be further adjusted to account for particular flow rate requirements in which the gas is being used. For example, when used for dehumidification, a threshold gas flow rate may be needed to facilitate efficient air transport in a building.

Optionally, the at least partially dehydrated gas produced as above may be recovered (e.g., for storage or utilization in a process where a dried gas is needed). In some instances, however, the at least partially dehydrated gas may be released to the atmosphere, such as when dehumidifying a building. Atmospheric release of the at least partially dehydrated gas may also take place, for example, when the at least partially dehydrated gas is an atmospheric gas and/or when recovery of water is an overriding process goal. More particularly, such methods may comprise exposing the sorptive fabric or the non-woven filament mat having water absorbed thereto to second conditions under which the phase change polymer is hydrophobic, such that liquid water separates from the sorptive fabric or the non-woven filament mat under the second conditions.

In particular examples, the first conditions may comprise a first temperature below a critical phase transition temperature at which the phase change polymer is hydrophilic. Any combination of heating, salinity or pH conditions, electromagnetic irradiation, and/or mechanical force may be employed to transition the phase change polymer to a hydrophobic state. In more particular examples, the second conditions may comprise a second temperature above the critical phase transition temperature at which the phase change polymer is hydrophobic. When heating is used to promote dewatering, the temperature may be selected such that the critical phase transition temperature is exceeded but the temperature is not so high that exclusively water vapor is released from the construct. Although higher temperatures may result in successful release of water vapor from the sorptive fabric or non-woven filament mat, such high-temperature processes are energetically unfavorable and may result in damage to the sorptive fabric if the temperature is too high. At the very least, heating above the critical phase transition temperature regenerates the sorptive fabric or non-woven filament mat so that they may absorb more water when exposed to additional water-laden gas. Removal of other conditions similarly promoting the hydrophilic-hydrophobic phase transition may similarly regenerate the sorptive fabric or non-woven filament in preparation for treatment of additional water-laden air or gas.

When heating is employed to transition the phase change polymer from the hydrophilic state to the hydrophobic state, any suitable heating source may be employed. Suitable heating sources may be direct or indirect, and include specific heating techniques such as, but not limited to, infrared heating, resistive heating, combustion heating, exchange of waste heat, solar heating, or any combination thereof. Thermal absorbers and electromagnetic radiation absorbers, such as carbon black, carbon nanotubes, metal nanowires or metal particles may facilitate these heating processes when incorporated in filaments comprising the phase change polymer.

More preferably, the liquid water may be collected once separated from the sorptive fabric. Separation may occur by gravity, for example, and the water may be removed through an outlet or collected in a vessel of an appropriate size. Optionally, a mechanical force may be applied to the sorptive fabric to promote separation of the liquid water therefrom. Such mechanical forces may be applied after a transition to the hydrophobic state has occurred. Therefore, a mechanical force applied to promote separation of liquid water differs from a mechanical force applied to promote a phase transition from a hydrophilic state to a hydrophobic state. Suitable mechanical forces to promote separation of liquid water include, for example, squeezing the construct (e.g., through rollers), vibrating the construct, blowing compressed gas through the construct, or any combination thereof. Such mechanical forces may be applied after the phase change polymer has transitioned from a hydrophilic state to a hydrophobic state and liquid water has formed but has not yet been released from the construct.

Sorptive fabrics and similar constructs containing a phase change polymer may be employed for gas dewatering and/or water recovery using the constructs themselves in free form or in dedicated systems for promoting dewatering. The sorptive fabrics and similar constructs in free form may be utilized, for example, by individuals in remote locales for recovering water vapor from the air, followed by gentle heating of the sorptive fabric or similar construct to produce drinking water on an as-needed basis. For higher gas throughput and/or water recovery therefrom, dedicated systems may be utilized.

Such systems may comprise a sorptive fabric or a non-woven filament mat comprising at least a phase change polymer exhibiting a reversible hydrophilic-hydrophobic phase transition and at least one additional material in contact with the phase change polymer, the at least one additional material comprising at least a water-sorptive material; a gas inlet and a gas outlet configured to provide a flow path through the sorptive fabric or the non-woven filament mat; and a heater effective to heat the sorptive fabric or non-woven filament mat above a critical phase transition temperature at which the phase change polymer undergoes a phase transition from a hydrophilic state to a hydrophobic state. A water recovery vessel or outlet may also be present. Optionally, the systems may comprise rollers, a vibratory mechanism, and/or a blower to facilitate recovery of liquid water from the sorptive fabric or non-woven filament mat above the critical phase transition temperature or when the phase change polymer has otherwise been transitioned from the hydrophilic state to the hydrophobic state and liquid water has been released.

EMBODIMENTS DISCLOSED HEREIN INCLUDE

A. Reversible water-absorbing constructs. The constructs comprise: a phase change polymer exhibiting a reversible hydrophilic-hydrophobic phase transition, and at least one additional material in contact with the phase change polymer; wherein the phase change polymer and the at least one additional material are formed as a plurality of filaments.

B. Methods for making a reversible water-absorbing construct. The methods comprise: ejecting a homogeneous polymer blend through a spinneret; wherein the homogeneous polymer blend comprises a phase change polymer exhibiting a reversible hydrophilic-hydrophobic phase transition, and at least one additional material; and applying to the spinneret a potential sufficient to convert the homogeneous polymer blend into at least one filament comprising the phase change polymer and the at least one additional material in contact with the phase change polymer.

C. Methods for dewatering a water-laden gas. The methods comprise: providing a sorptive fabric or a non-woven filament mat comprising a plurality of filaments comprising a phase change polymer exhibiting a reversible hydrophilic-hydrophobic phase transition and at least one additional material in contact with the phase change polymer, the at least one additional material comprising at least a water-sorptive material; flowing a water-laden gas through the sorptive fabric or the non-woven filament mat at first conditions under which the phase change polymer is hydrophilic; and absorbing at least some water from the water-laden gas onto the sorptive fabric or the non-woven filament mat under the first conditions and forming an at least partially dehydrated gas.

D. Systems for water recovery. The systems comprise: a sorptive fabric or a non-woven filament mat comprising a plurality of filaments comprising at least a phase change polymer exhibiting a reversible hydrophilic-hydrophobic phase transition and at least one additional material in contact with the phase change polymer, the at least one additional material comprising at least a water-sorptive material; a gas inlet and a gas outlet configured to provide a gas flow path through the sorptive fabric or the non-woven filament mat; and a heater effective to heat the sorptive fabric or the non-woven filament mat above a critical phase transition temperature at which the phase change polymer undergoes a phase transition from a hydrophilic state to a hydrophobic state.

Each of embodiments A, B, C and D may have one or more of the following additional elements in any combination:

Element 1: wherein the at least one additional material comprises at least a water-sorptive material.

Element 2: wherein the at least one additional material further comprises a structural reinforcement material, an artificial pore former, a functional material, or any combination thereof.

Element 3: wherein the water-sorptive material comprises at least one water-sorptive material selected from the group consisting of a metal oxide, a non-metal oxide, a zeolite, a charged and/or hydrophilic polymer, a metal-organic framework, and any combination thereof.

Element 4: wherein the reversible water-absorbing construct comprises up to about 70 wt. % of the water-sorptive material.

Element 5: wherein the water-sorptive material interacts synergistically with the phase change polymer to absorb a greater quantity of water than do separated, substantially equivalent amounts of the phase change polymer and the water-sorptive material.

Element 6: wherein the phase change polymer and the at least one additional material are admixed or the at least one additional material is located upon a surface of the phase change polymer within the plurality of filaments.

Element 7: wherein the plurality of filaments are formed into at least one fiber or a non-woven filament mat.

Element 8: wherein the at least one fiber comprises a plurality of fibers that collectively define a sorptive fabric.

Element 9: wherein the sorptive fabric comprises a woven fabric.

Element 10: wherein the sorptive fabric comprises a non-woven fabric.

Element 11: wherein the reversible water-absorbing construct further comprises a support layer upon which the plurality of filaments are overlaid or adhered thereto.

Element 12: wherein the phase change polymer undergoes the reversible hydrophilic-hydrophobic phase transition when heated above a critical phase transition temperature, exposed to specified salinity or pH conditions, exposed to electromagnetic radiation, subjected to a mechanical force, or any combination thereof.

Element 13: wherein the phase change polymer comprises a homopolymer or copolymer comprising an N-alkyl(meth)acrylamide monomer unit, an N,N-dialkyl(meth)acrylamide monomer unit or any combination thereof.

Element 14: wherein the phase change polymer comprises poly(N-isopropylacrylamide) or a copolymer thereof.

Element 15: wherein the at least one additional material comprises poly(meth)acrylic acid, polyvinylpyrrolidone, or a copolymer thereof nanowires; carbon nanotubes; graphene; carbon black; an artificial pore former; or any combination thereof.

Element 16: wherein the method further comprises processing the at least one filament into a sorptive fabric or a non-woven filament mat.

Element 17: wherein the method further comprises exposing the sorptive fabric or the non-woven filament mat having water absorbed thereto to second conditions under which the phase change polymer is hydrophobic; wherein liquid water separates from the sorptive fabric or the non-woven filament mat under the second conditions.

Element 18: wherein the method further comprises collecting the liquid water.

Element 19: wherein the method further comprises applying a mechanical force to the sorptive fabric or the non-woven filament mat to promote separation of the liquid water therefrom.

Element 20: wherein the second conditions comprise heating the sorptive fabric or the non-woven filament mat above a critical phase transition temperature, exposing the sorptive fabric or the non-woven filament mat to specified salinity or pH conditions, exposing the sorptive fabric or the non-woven filament mat to electromagnetic radiation, subjecting the sorptive fabric or the non-woven filament mat to a mechanical force that promotes a phase change, or any combination thereof.

Element 21: wherein the second conditions comprise a second temperature above a critical phase transition temperature at which the phase change polymer is hydrophobic.

Element 22: wherein the first conditions comprise a first temperature below the critical phase transition temperature at which the phase change polymer is hydrophilic.

Element 23: wherein the water-laden gas comprises humidified air.

By way of non-limiting example, exemplary combinations applicable to A and D include, but are not limited to: 1-3; 1-4; 1, 3 and 4; 1 and 5; 1 and 6; 1, and 7 or 8; 1 and 11; 1 and 12; 1, and 13 or 14; 6, and 7 or 8; 6 and 11; 6 and 12; 6, and 13 or 14; 7 or 8, and 11; 7 or 8, and 12; 7 or 8, and 13 or 14; 11 and 12; and 11, and 13 or 14. Exemplary combinations applicable to B include any of the foregoing combinations, optionally in further combination with 16, or 16 in combination with any one of 1-15. Exemplary combinations applicable to C include any of the foregoing combinations, optionally in further combination with any one of 17-23, or any one of 17-23 in combination with any one of 1-15. Additional exemplary combinations applicable to C include, but are not limited to, 17 and 18; 17-19; 17 and 19; 17 and 20; 17 and 21; 17 and 22; 17, 21 and 22; 17 and 23; 18 and 19; 18 and 20; 18 and 21; 18 and 22; 18, 21 and 22; 18 and 23; 20 and 21; 20 and 22; 20-22; 20 and 23; 21 and 22; 21 and 23; and 22 and 23.

To facilitate a better understanding of the present disclosure, the following examples of preferred or representative embodiments are given. In no way should the following examples be read to limit, or to define, the scope of the invention.

EXAMPLES

Simulated data showing the total energy (heat) required to remove water from a representative inorganic desiccant through heating and vaporization compared to through a reversible phase change at various water loadings is summarized in Table 1 below. The calculations are based upon warming 1 kg of water-loaded (wet) solids (water/dessicant or water/polymer) from a temperature of 20° C. to the indicated temperature and employing the following heat capacity values: $c_{water}$=4.184 kJ/kg/K; $C_{polymer}$=1 kJ/kg/K; $c_{desiccant}$~1 kJ/kg/K; $c_{water\ vap.\ phase\ change}$=2260 kJ/kg (water); and $c_{polymer\ phase\ change}$=1010 kJ/kg (polymer). The estimated phase change heat capacity for poly(N-isopropylacrylamide) may be found in Adv. Mater. Res., 2012, pp. 269-284, 1. The required heat for heating water or solids from 20° C. to the indicated temperature is determined by multiplying the mass of water, polymer, or inorganic desiccant, as appropriate, by the corresponding heat capacity value and the temperature differential. The required heat for the phase change is determined by multiplying the heat of vaporization of water ($c_{water\ vap.\ phase\ change}$) by the amount of water in the case of inorganic desiccant, or by multiplying the heat associated with the polymer phase change ($c_{polymer\ phase\ change}$) by the amount of polymer in the case of the phase change polymer. The total heat required for regeneration per kilogram of wet solids is determined by adding these values.

TABLE 1

| | $T_{regen}$ ($\Delta T$, ° C.) | % Water (Mass water in 1 kg total wet solids) | Water Heating $Q_{\Delta T}$ (kJ) | Solids Heating $Q_{\Delta T}$ (kJ) | Water or Polymer Phase Change $Q_{phase\ change}$ (kJ) | Total Q (kJ) |
|---|---|---|---|---|---|---|
| Inorganic Desiccant (0.3 kg water/1 kg desiccant) | ~100 (80) | 23% (0.23 kg) | 77.0 | 61.6 | 519.8 | 658.4 |

TABLE 1-continued

| | $T_{regen}$ (ΔT, °C.) | % Water (Mass water in 1 kg total wet solids) | Water Heating $Q_{\Delta T}$ (kJ) | Solids Heating $Q_{\Delta T}$ (kJ) | Water or Polymer Phase Change $Q_{phase\ change}$ (kJ) | Total Q (kJ) |
|---|---|---|---|---|---|---|
| Phase change polymer (2 kg water/1 kg polymer) | ~40 (20) | 66.6% (0.67 kg) | 56.1 | 6.6 | 333.3 | 396.0 |
| Phase change polymer (3 kg water/1 kg polymer) | ~40 (20) | 75% (0.75 kg) | 62.7 | 5 | 252.5 | 320.2 |
| Phase change polymer (4 kg water/1 kg polymer) | ~40 (20) | 80% (0.80 kg) | 66.9 | 4 | 202 | 272.9 |

As shown, a considerably higher amount of heat is required for the inorganic desiccant, and a lower amount of water is recoverable. In the case of the phase change polymer, the amount of heat required decreases as the water loading increases. When scaled to the amount of water recoverable (total Q/kg of recoverable water), the amount of required heat for the inorganic desiccant was about 5-8 times higher than the phase change polymer examples.

Figure 4:
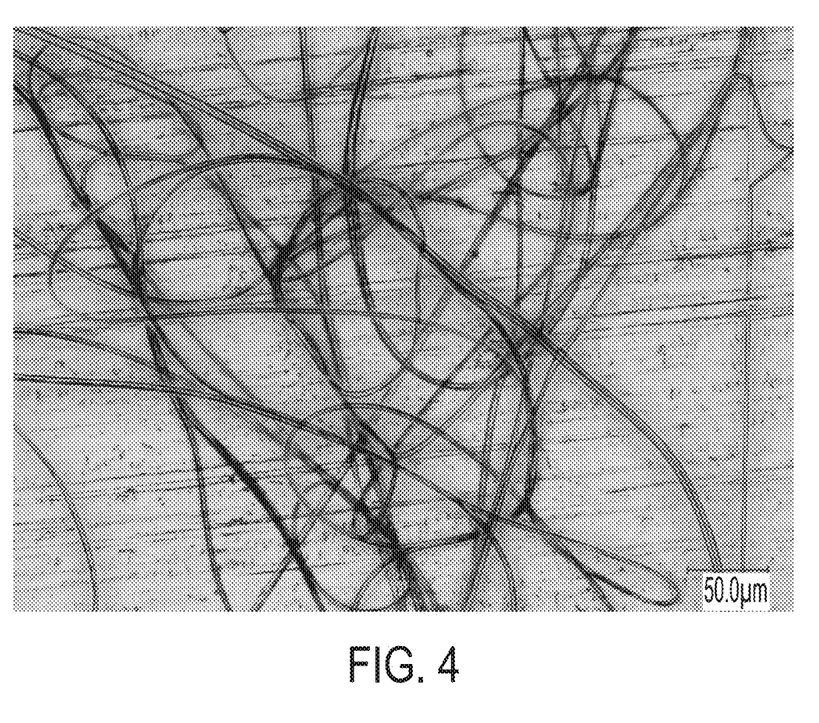
FIG. 4 shows an optical micrograph of fibers forms through electrospinning.

Electrospinning: A solution of polyacrylic acid and phase change polymer (poly-N-isopropylacrylamide) was prepared in ethanol. The solution was loaded into a syringe attached to a 22 gauge stainless steel needle. The needle was placed 135 mm above a grounded aluminum plate and held at an electrical potential of +10 kV to provide a field of 0.074 kV/mm at the tip of the needle. The syringe was then pumped at a rate of 2 mL/hr. The resulting fibers were a few microns in diameter. FIG. 4 is an optical micrograph of fibers forms through electrospinning.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. A reversible water-absorbing construct comprising:
a phase change polymer exhibiting a reversible hydrophilic-hydrophobic phase transition, and at least one additional material in contact with the phase change polymer;
   wherein the phase change polymer and the at least one additional material are formed as a plurality of filaments.

2. The reversible water-absorbing construct of claim 1, wherein the at least one additional material comprises at least a water-sorptive material.

3. The reversible water-absorbing construct of claim 2, wherein the at least one additional material further comprises a structural reinforcement material, an artificial pore former, a functional material, or any combination thereof.

4. The reversible water-absorbing construct of claim 2, wherein the water-sorptive material comprises at least one water-sorptive material selected from the group consisting of a metal oxide, a non-metal oxide, a zeolite, a charged and/or hydrophilic polymer, a metal-organic framework, and any combination thereof.

5. The reversible water-absorbing construct of claim 2, wherein the reversible water-absorbing construct comprises up to about 70 wt. % of the water-sorptive material.

6. The reversible water-absorbing construct of claim 2, wherein the water-sorptive material interacts synergistically with the phase change polymer to absorb a greater quantity of water than do separated, equivalent amounts of the phase change polymer and the water-sorptive material.

7. The reversible water-absorbing construct of claim 1, wherein the phase change polymer and the at least one additional material are admixed or the at least one additional material is located upon a surface of the phase change polymer within the plurality of filaments.

8. The reversible water-absorbing construct of claim 1, wherein the plurality of filaments are formed into at least one fiber or a non-woven filament mat.

9. The reversible water-absorbing construct of claim 8, wherein the at least one fiber comprises a plurality of fibers that collectively define a sorptive fabric.

10. The reversible water-absorbing construct of claim 9, wherein the sorptive fabric comprises a woven fabric.

11. The reversible water-absorbing construct of claim 9, wherein the sorptive fabric comprises a non-woven fabric.

12. The reversible water-absorbing construct of claim 1, further comprising:
a support layer upon which the plurality of filaments are overlaid or adhered thereto.

13. The reversible water-absorbing construct of claim 1, wherein the phase change polymer undergoes the reversible hydrophilic-hydrophobic phase transition when heated above a critical phase transition temperature, exposed to specified salinity or pH conditions, exposed to electromagnetic radiation, subjected to a mechanical force, or any combination thereof.

14. The reversible water-absorbing construct of claim 1, wherein the phase change polymer comprises a homopolymer or copolymer comprising an N-alkyl(meth)acrylamide monomer unit, an N,N-dialkyl(meth)acrylamide monomer unit or any combination thereof.

15. The reversible water-absorbing construct of claim 1, wherein the phase change polymer comprises poly(N-isopropylacrylamide) or a copolymer thereof.

16. The reversible water-absorbing construct of claim 15, wherein the at least one additional material comprises poly(meth)acrylic acid, polyvinylpyrrolidone, or a copolymer thereof; nanowires; carbon nanotubes; graphene; carbon black; an artificial pore former; or any combination thereof.

* * * * *